United States Patent [19]

Erman et al.

[11] Patent Number: 4,773,721
[45] Date of Patent: Sep. 27, 1988

[54] OPTICAL SWITCHING ELEMENT BETWEEN TWO LIGHT WAVE GUIDES AND OPTICAL SWITCHING MATRIX CONSTITUTED BY THESE SWITCHING ELEMENTS

[75] Inventors: Marko Erman, Paris; Nakita Vodjdani, La Queue-en-Brie; Jean-Bernard Theeten, Ozoir-la-Ferriere, all of France

[73] Assignee: U.S. Philips Corp., New York, N.Y.
[21] Appl. No.: 882,658
[22] Filed: Jul. 7, 1986
[30] Foreign Application Priority Data
Jul. 11, 1985 [FR] France ............................. 85 10641
[51] Int. Cl.$^4$ ..................... G02B 6/10; H01L 29/48
[52] U.S. Cl. ........................ 350/96.13; 350/96.14; 350/96.16; 357/15; 357/30; 357/32; 357/55
[58] Field of Search ............... 350/96.10, 96.11, 96.12, 350/96.13, 96.14, 96.15, 96.16, 96.29, 96.30, 370, 374; 250/227; 357/15, 17, 19, 23.2, 25, 30, 45, 32, 55

[56] References Cited

U.S. PATENT DOCUMENTS

| | | | |
|---|---|---|---|
| 3,785,717 | 1/1974 | Croset et al. | 350/96.12 |
| 4,048,591 | 9/1977 | Auracher | 350/96.14 |
| 4,065,729 | 12/1977 | Gover et al. | 357/19 X |
| 4,153,328 | 8/1979 | Wang | 350/96.11 |
| 4,221,460 | 9/1980 | Hepner et al. | 350/96.13 |
| 4,400,713 | 8/1983 | Bauge et al. | 357/15 X |
| 4,580,873 | 4/1986 | Levinson | 350/96.20 |
| 4,630,883 | 12/1986 | Taylor et al. | 350/96.15 |
| 4,674,828 | 6/1987 | Takahashi et al. | 350/96.13 |
| 4,679,894 | 7/1987 | Pavlath | 350/96.15 |
| 4,681,397 | 7/1987 | Bhatt | 350/96.13 |
| 4,696,059 | 9/1987 | MacDonald et al. | 350/96.14 X |
| 4,707,057 | 11/1987 | Takahashi et al. | 350/96.14 |
| 4,708,423 | 11/1987 | Erman et al. | 350/96.15 |
| 4,720,468 | 1/1988 | Menigaux et al. | 357/19 X |
| 4,732,446 | 3/1988 | Gipson et al. | 350/96.15 |

FOREIGN PATENT DOCUMENTS

| | | | |
|---|---|---|---|
| 54-186 | 1/1979 | Japan | 350/96.14 |
| 59-113424 | 6/1984 | Japan | 350/96.14 |

OTHER PUBLICATIONS

Auracher et al. "New Directional Coupler for Integrated Optics", *J. of Appl. Phys.* vol. 45, No. 11, 11/74, pp. 4997-4999.
Vodjdani et al., "Structural Analysis and Optical Characterization . . . ", Journal of Crystal Growth 71 (1985) pp. 141-148, North Holland, Amst.
Carenco et al., "Low-Loss GaAs-alx Gai-xAs Double . . . ", Tech. Digest, Orlando Hyatt Hotel Kissimee, Florida, Apr. 24-26, 1984, pp. ThB4-1.
Hunsperger, "Integrated Optics: *Theory and Technology*", Springer-Verlag, 1984, 2nd ed, pp. 34-37.

*Primary Examiner*—William L. Sikes
*Assistant Examiner*—Brian M. Healy
*Attorney, Agent, or Firm*—Thomas A. Briody; Jack E. Haken

[57] ABSTRACT

An optical switching element including two parallel light wave guides, whose opposite walls are mutually separated by a small distance (d), the so-called coupling distance, each constituted by a strip of a semiconductor material formed on a semiconductor substrate having a refractive index lower than that of the guides, these guides each transporting a monomode wave and the switching being initiated by the effect of polarization means applied to the guides, characterized in that the strip constituting one of the guides ($G_1$) designated as first guide is formed as a first uniform layer on the substrate (1), in that the strip constituting this guide is covered by a uniform intermediate layer (I) of a compatible semiconductor material, having an index lower than that of the guides and having a thickness which forms the coupling distance between the two guides, in that the strip constituting the other guide ($G_2$) designated as second guide is formed as another uniform layer at the surface of the intermediate layer, and in that by the effect of the polarization means applied to the guides the light which is introduced into one of the guides parallel to its optical axis at a first distance from the substrate is caused to propagate through the other guide parallel to the optical axis of the latter at a second distance from the substrate, the assembly of the first guide forming with the second guide and with the intermediate layer a so-called stracked structure, whose longitudinal dimension is the coupling length.

26 Claims, 5 Drawing Sheets

OPTICAL SWITCHING ELEMENT BETWEEN TWO LIGHT WAVE GUIDES AND OPTICAL SWITCHING MATRIX CONSTITUTED BY THESE SWITCHING ELEMENTS

BACKGROUND OF THE INVENTION

The invention relates to an optical switching element including two light wave guides, which are parallel and whose opposite walls are mutually separated by a small coupling distance, said light wave guides each being constituted by a strip of a semiconductor material having a first refractive index formed on a semiconductor substrate of a material having a second lower refractive index such that the light is confined in the strip constituting the guide, the dimensions of said guides being such that they each transport a monomode wave and the switching operation being initiated by the effect of the potential of the polarization means applied to the guides.

The invention moreover relates to an optical switching matrix constituted by a number nxn of these switching elements.

The invention is used in the switching of optical signals transported through optical fibres, for example in the telecommunication field, in which the switching between numerous optical fibres has to be rendered possible in order to avoid that the optical signals transported through the fibres have to be converted into electric signals during the switching between the different subscribers.

An optical switching element apt to form a switching matrix of the kind defined in the opening paragraph is known from the publication entitled "Low-loss GaAs—$Ga_{1-x}Al_xAs$ double-heterostructure directional coupler" by A. Carenco, P. Sansonetti et alii in "Technical Digest, Orlando Hyatt Hotel Kissimee, Florida, April 24–26, 1984" with the reference "Th B 4–1".

This document discloses a switching element constituted by two light wave guides constituted by strips of GaAs. These strips are parallel and are formed side by side on the surface of a layer of $Ga_{1-x}Al_xAs$, which serves as a confinement layer between these light wave guides and the flat substrate of GaAs. Another layer of $Ga_{1-x}Al_xAs$ covers each of the strips constituting the guides. The latter are obtained on the other hand in relief on the substrate by etching of the starting layer. Electrodes of the Schottky type are finally formed on the surface of each of the guides, while the opposite surface of the substrate is provided with a layer forming an ohmic contact.

The guides each transport a monomode wave and due to the small distance laterally separating them a polarization applied to one or the other of the guides permits of changing the coupling of the two monomode guides, thus ensuring the desired switching operation.

A switching matrix can be obtained from such switching elements by joining the guides of one element to the guides of another element by means of curved guide portions.

However, such a structure has several disadvantages. In the first place, the coupling distance between the guides is to be understood to mean the lateral distance between the strips on the substrate. This distance is an extremely critical factor for the behaviour of the switching element. Now the lateral distance between two semiconductor tapes formed on a flat surface can be controlled only with difficulty and is at any rate always large. In the device described in the aforementioned document, this lateral coupling distance is of the order of 2 to 3 $\mu$m. Since the coupling length, i.e. the longitudinal dimension of the light wave guides, is associated with the lateral coupling distance, this longitudinal dimension in this case is several millimeters, which is really extremely large with regard to dimensions of integrated devices.

Moreover, the curved guide portions interconnecting the switching elements so as to form a matrix necessarily establish this connection at a small angle, which results in that such a matrix occupies a very large surface area. On the other hand, the methods of etching or of epitaxial growth used to form these guide portions are always anisotropic, which results in that the external walls of these portions are rough or have steps leading to losses in these portions.

Now in the field concerned of telecommunication application, there is a demand for electrooptical circuits of increasingly higher performance, of increasingly more pronounced miniaturization and of increasingly lower cost, i.e. a simpler construction.

SUMMARY OF THE INVENTION

The present invention permits of solving these problems by means of a switching element of the kind defined in the opening paragraph, characterized in that the strip constituting one of the guides, the so-called first light wave guide, is formed from a first uniform layer on the substrate; in that this strip constituting the first guide is covered by a uniform layer of a compatible semiconductor material, the so-called intermediate layer, whose refractive index is lower than that of the guides, whose thickness forms the coupling distance between the two light wave guides in that the strip constituting the other guide, the so-called second light wave guide, is formed from another uniform layer at the surface of the intermediate layer; and in that by the effect of the potentials of the polarization means applied to the guides the light which is introduced into one of the guides parallel to its optical axis at a first distance from the substrate is caused to propagate through the other guide parallel to the optical axis of the latter at a second distance from the substrate, the assembly of the first guide, the so-called lower guide, forming with the second guide, the so-called upper guide, and with the intermediate layer a structure, the so-called first stacked structure.

In these conditions, the intermediate layer can be very thin. In fact layer dimensions at right angles to the substrate can always be controlled much more readily than the lateral dimensions necessary to realize the device known from the publication mentioned as prior art. The coupling distance between the guides is then very small, which results in that the coupling length is also proportionally small. The device obtained according to the present invention is therefore smaller than the device obtained according to the prior art. Moreover, it has a higher performance, the coupling being improved at the same time by the small distance mutually separating the guides and by the uniformity of this distance.

This switching element can also be characterized in that a flat mirror, the so-called first mirror, is arranged in the path of the beam transported by the second light wave guide of the first stacked structure at right angles to the substrate and enclosing with the optical axis of this second guide an angle different from the perpendicular line, and in that a third light wave guide constituted by a strip, identical to that constituting the second guide transports the beam originating from this second guide and reflected by the mirror at the same distance from the substrate as the second guide.

The advantage of this element is that the mirror used to deviate the beam of the second guide is a total-reflection mirror and consequently that the separation of the paths followed by the beams originating from the switching element is obtained without any loss.

This switching element can further be characterized in that a fourth light wave guide forms with an intermediate layer and the third light wave guide a so-called second stacked structure in which the fourth guide is the lower guide and the third guide is the upper guide: in that this second structure is provided with polarization means similar to those of the first stacked structure, and in that a flat mirror, the second mirror, parallel to the first mirror and having a similar structure is arranged in the path of the upper guide of the second stacked structure at the end of this structure.

In an embodiment, this switching element is characterized in that the layers constituting the guides and the intermediate layer are epitaxial layers formed on a monocrystalline substrate.

In this embodiment, the switching element according to the invention can be used very effectively because the thickness of the epitaxial layers can be readily controlled.

In the latter embodiment, the light is particularly well defined in the light wave guides and the losses are particularly low. In fact, as the consideration of the prior art has shown, all the manufacturing methods applied to semiconductor devices are more or less anisotropic. Therefore, it is advantageous to utilize this property for ensuring that the longitudinal surfaces of the guides and the mirrors are crystallographic surfaces.

A switching element according to the invention, when it includes a first and a second stacked structure and a first and a second mirror, is then particularly advantageous for forming a switching matrix having n inputs and n outputs comprising a number nxn of these juxtaposed switching elements.

This matrix then affords the advantage of having a small surface area and a simple construction. Moreover, it ensures a switching operation of the broadband type, which could not be obtained by means of a purely electric switching operation.

BRIEF DESCRIPTION OF THE INVENTION

The invention will be understood more clearly by means of the following description illustrated by the accompanying Figures, of which.

DETAILED DESCRIPTION OF THE INVENTION

Figure 1A:
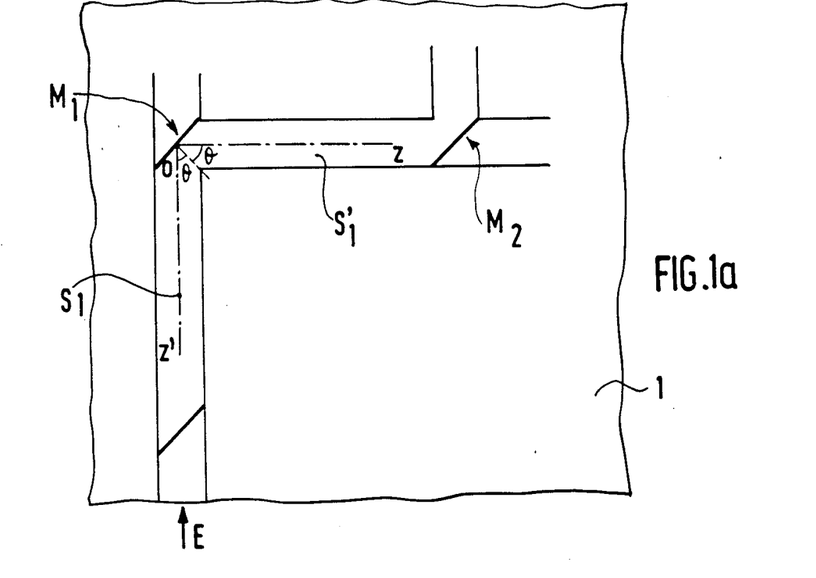
FIG. 1a plan view of a switching element according to the invention.
Figure 1B:
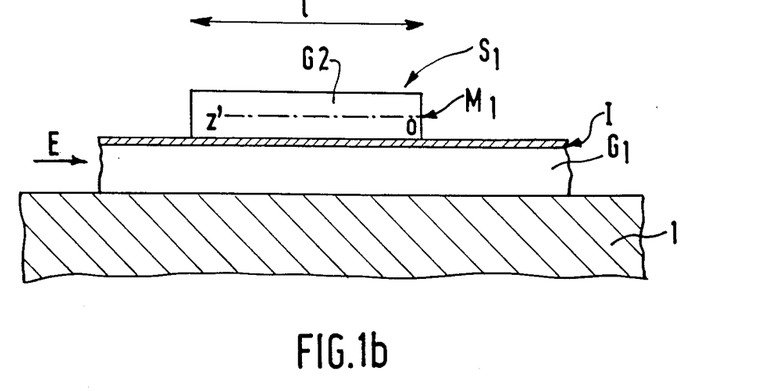
FIG. 1b shows in sectional view taken on the axis z'o this switching element.
Figure 1C:
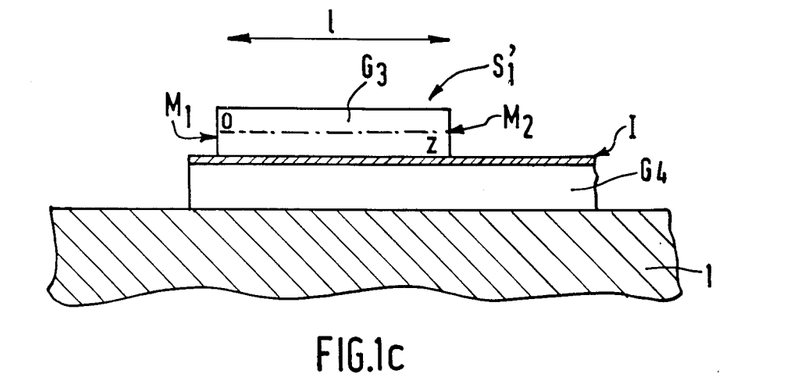
FIG. 1c shows sectional view taken on the axis oz this switching element.

As shown in the plan view of FIG. 1a and in the sectional view taken on the axes $z'_o$ and oz, respectively, in FIGS. 1b and 1c, the switching element according to the invention is constituted by a first semiconductor tape constituting a first light wave guide $G_1$ formed on the surface of a flat substrate 1 of a compatible semiconductor material, whose refractive index $n_S$ is lower than the index $n_g$ of the material forming the first guide $G_1$.

The switching element is then formed from a layer I, the so-called intermediate layer, of a semiconductor material having a refractive index $n_i$ lower than the index of the material forming the guide obtained at the surface of the latter. This layer has a small thickness d. It is intended to permit the coupling between the first light wave guide $G_1$ and a second light wave guide $G_2$ constituted by a second tape of semiconductor material of the same kind as that forming the first guide $G_1$.

The cross-section of the light wave guides $G_1$ and $G_2$ may be rectangular. In this case, the guides have at right angles to the substrate a dimension e and parallel to the substrate a dimension w, as shown in cross-sectional view in FIG. 1d.

Figure 1D:
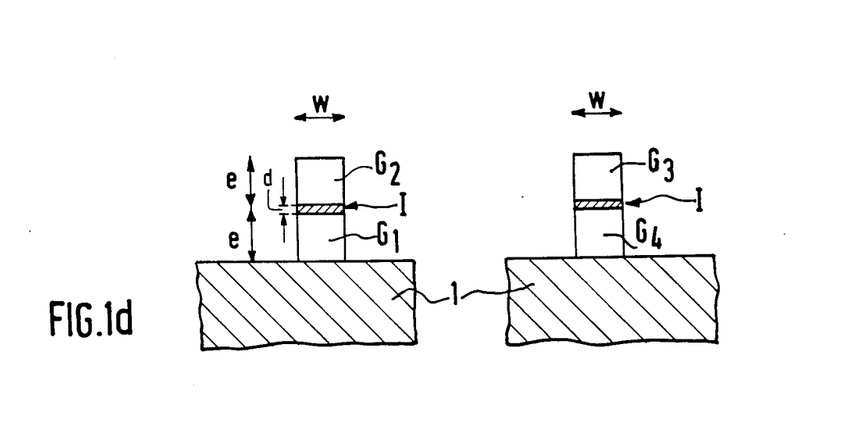
FIG. 1d shows in cross-section a stacked structure.

These guides are designed to transport monomode waves. Their dimension e at right angles to the substrate is given by the relation:

$$0 < e^2 < \frac{m_S^2 \lambda_o^2}{4(n_g^2 - n_S^2)} \quad (1)$$

in which $m_S = 1$, which constant corresponds to the first order mode, and $\lambda_o$ is the propagation wavelength.

This relation expresses the fact that this dimension e has to be sufficient in order that the guide transport the fundamental mode, but in limited form so that the propagation of the first order mode lying above it is avoided. This relation is known from the publication "Integrated Optics: Theory and Technology" by Robert G. Hunsperger, edited by Springer-Verlag, Berlin, Heidelberg, New York.

The structure shown in FIG. 1d constituted by the stack on the substrate of the semiconductor strip forming the first guide $G_1$, of the intermediate layer I and of the semiconductor tape forming the second guide $G_2$ is designated as a stacked structure. It is fundamentally different from the structure according to the prior art in which the parallel guides were situated on the same surface of the substrate and in which the coupling was lateral.

When by polarization means to be described below a potential difference is applied to the guides $G_1$ and $G_2$, a considerable electric field is produced at the level of one of the guides. This field permits by an electrooptical linear effect of modifying the refractive index of the guide at the area at which the polarization is applied and of inducing in this guide an index difference:

$\Delta n_g = n_g \times r \times E$, in which r is an electrooptical constant of the material and $\vec{E}$ is the electric field. Thus, in accordance with the polarization applied to the guides of the stacked structure, a light beam having a wavelength $\lambda_o$ introduced into the first light wave guide $G_1$ either continues its path in the guide $G_1$ or passes through the guide $G_2$.

The length 1 of the stacked structure required for coupling the guides $G_1$ and $G_2$ is a function on the one hand of the refractive index $n_i$ of the intermediate layer I, but on the other hand of its thickness d.

According to the aforementioned prior art, the light wave guides formed on the surface of a substrate were mutually separated by a distance of about 3 $\mu$m. In these conditions, the coupling length varied from 4 to 8 mm in accordance with the manufacturing method used.

On the contrary, according to the present invention, the intermediate layer, which may be, for example, an epitaxial layer, has a very readily controllable thickness. An extremely uniform thickness as small as 0.5 $\mu$m can readily be obtained. With such a thickness, the order of the coupling length 1 for a semiconductor material of the III-V group will be $1 \simeq 1$ mm.

Thus, the device according to the invention clearly has important advantages in the field of integrated electrooptical systems, in which there is a demand for small and miniaturized devices.

As shown in FIGS. 1, the stacked structure $S_1$ consequently constitutes a switching element between the guides $G_1$ and $G_2$.

In order to direct the beam transmitted by the guide $G_1$ to a different direction, a flat mirror $M_1$ is placed in the path of the beam of the guide $G_2$ at the end of the first stacked structure $S_1$.

This flat mirror $M_1$ is constituted by a flat portion of the lateral wall of the guide $G_2$, this flat portion being perpendicular to the substrate and enclosing an angle $\theta$ with respect to the optical axis $z'_o$ of the guide $G_2$. This mirror $M_1$ consequently reflects the beam transported by the guide $G_2$ at an angle $2\theta$.

As shown in FIGS. 1a and 1c, the latter figure showing a section of the device of FIG. 1a taken on the axis oz of reflection by the mirror $M_1$, the beam reflected by $M_1$ can be transported by a third light wave guide $G_3$ having the same dimensions and composition as the guide $G_2$.

On the other hand, in order to use such a switching element in the manufacture of a switching matrix, a fourth guide $G_4$ can be associated with the guide $G_3$ with an intermediate layer I for forming a stacked structure $S_1'$ identical to the first structure $S_1$ This second stacked structure $S_1'$ will moreover be provided with polarization means substantially identical to those of the first stacked structure $S_1$ and with a mirror $M_2$ having the same structure as the mirror $M_1$, parallel to the latter and arranged in the path of the beam transported by the guide $G_3$, as shown in FIGS. 1a and 1c.

Hereinafter, the guides $G_1$ and $G_4$ of the stacked structures $S_1$ and $S_1'$ will be designated as lower guides, while the guides $G_2$ and $G_3$ will be designated as upper guides (FIG. 1d).

Thus, by the effect of the polarizations applied to the stacked structures $S_1$ and $S_1'$, it is possible, starting from a monomode beam applied to the input E of the lower guide of the structure $S_1$, to have available:

either a monomode beam which continues its path in the lower guide of the first structure $S_1$;

or a monomode beam which propagates in the upper guide of the first structure $S_1$, is reflected by the first mirror $M_1$ and continues its path in the upper guide of the second structure $S_1'$.

By the effect of the polarizations, the latter beam either can be reflected by the second mirror $M_2$; or can pass through the lower guide of the second structure $S_1'$.

Starting from the switching element formed by the two stacked structures $S_1$ and $S_1'$, an optical switching matrix can be obtained comprising a number n of inputs $IN_1$, $IN_2$... $IN_n$ and a number n of outputs $0_1$, $0_2$... $0_n$, between which the switching operation is effected.

Figure 3:
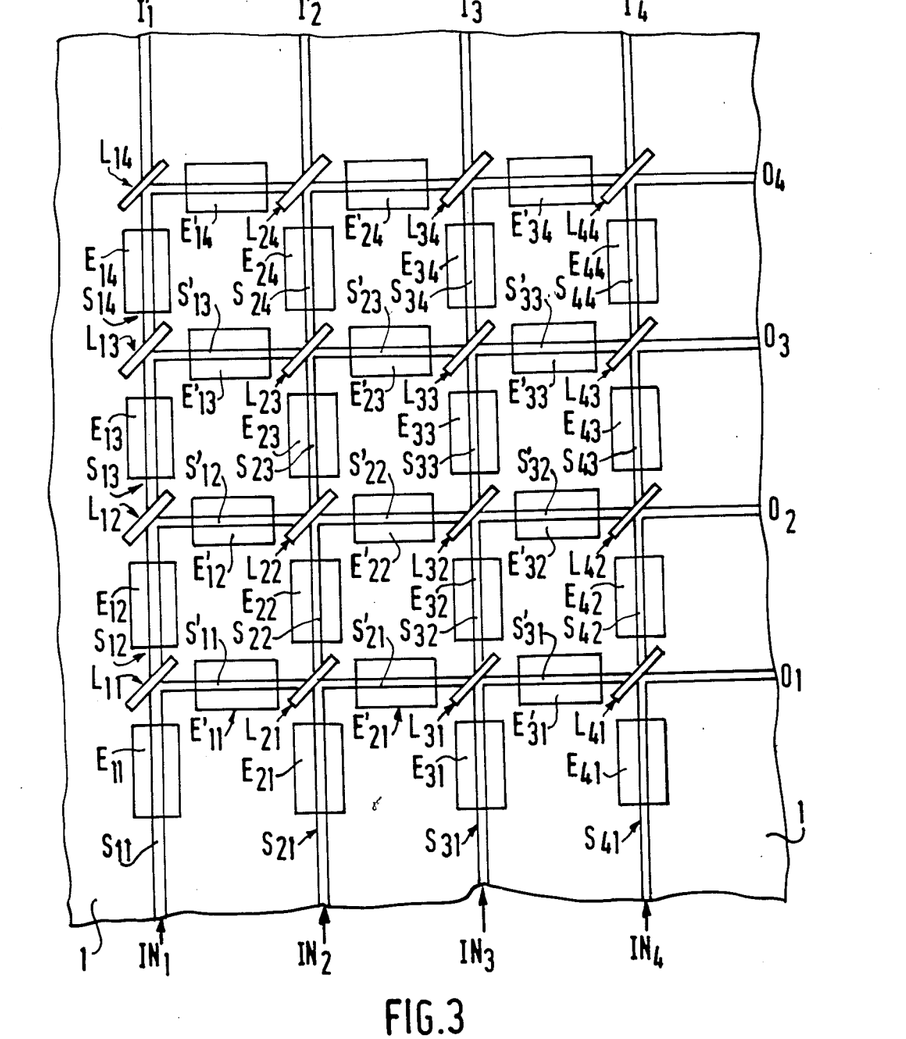
FIG. 3 shows an example of a switching matrix formed by means 4×4 of these switching elements.

This matrix is formed by nxn of these switching elements which are juxtaposed and arranged so that the column of the matrix defined as being in line with the inputs $IN_1$, $IN_2$...$IN_n$, are formed by the said first stacked structures of the elements and are designated in this case by respective reference numerals $S_{11}$, $S_{12}$, $S_{13}$, $S_{1n}$ for the first column, $S_{21}$, $S_{22}$, $S_{23}$... etc. for the second column and so on to $S_{n1}$, $S_{n2}$... for the $n^{th}$ column. These first stacked structures are themselves arranged with respect to each other so that the lower guides are in line with each other.

On the other hand, the lines of the matrix defined as being in line with the outputs $0_1$, $0_2$... $0_n$ are formed by the said second stacked structures of the elements designated in this case by respective reference numerals $S'_{11}$, $S'_{12}$... $S'_{1n}$ for the first line, $S'_{21}$, $S'_{22}$... $S'$ for the second line and so on to $S'_{n1}$... $S'_{nn}$ for the last line. These second stacked structures are moreover arranged with respect to each other so that the lower guides are in line with each other.

Finally, these elements are juxtaposed so that the first mirror of an element forms with the second mirror of an adjacent element a plate having parallel surfaces, of which the external surfaces are totally reflecting.

A switching matrix realized according to this model and comprising four inputs and four outputs is shown in FIG. 3. These plates having parallel surfaces are then designated by $L_{11}$... $L_{nn}$.

The polarization means of each stacked structure are designated in FIG. 3 by reference symbol E provided with the same index as the stacked structure to which they are applied.

In order to realize the switching elements according to the invention or matrices formed from these elements, it is advantageous to choose a semi-insulating material of the III-V group because this material permits the propagation of the waves at the wavelengths 1.3 $\mu$m and 1.55 $\mu$m aimed at for the applications in the field of telecommunication.

Four embodiments of switching elements including such materials are given here by way of example.

EXAMPLE I

Figure 2A:
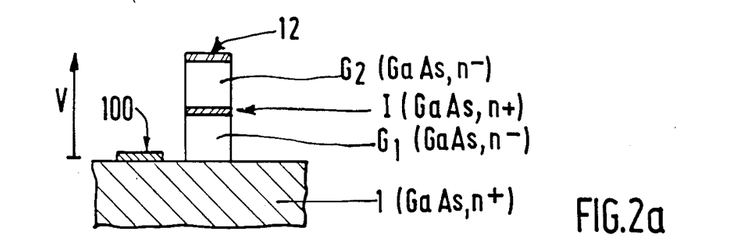
FIGS. 2a, 2b, 2c, 2d show for different embodiments of a switching element a sectional view of a stacked structure.

In this embodiment shown in FIG. 2a, the substrate 1 can consist of gallium arsenide (GaAs) of the $n^+$ type, like the intermediate layer(s) I. The lower and upper guides (for example $G_1$ and $G_2$) consist of gallium arsenide (GaAs) of the $n^-$ type. In fact, the gallium arsenide of the $n^-$ type has a refractive index of a value higher than that of gallium arsenide of the $n^+$ type, which permits of obtaining the confinement of the light in the guides.

The polarization means for each stacked structure thus constituted are formed by a first electrode 12 of the Schottky type, whose contact is formed on the upper guide, and by a second electrode of the type having an ohmic contact 100 formed on the substrate 1.

The operation of switching between one guide and the other guide of the stacked structure is effected in that a difference in potential V is applied between the first electrode 12 and the ohmic contact 100 formed on the substrate.

EXAMPLE II

Figure 2B:
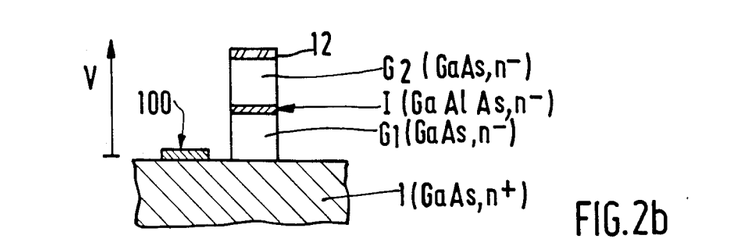

In this embodiment shown in FIG. 2b, the substrate 1 can consist of gallium arsenide (GaAs) of the n+ type; the lower and upper guides (for example $G_1$ and $G_2$) can consist of gallium arsenide (GaAs) of the n− type, and the intermediate layer(s) I can consist of gallium aluminium arsenide (GaAlAs) of the n− type.

The polarization means for each stacked structure thus constituted are formed by a first electrode 100 of the type having an ohmic contact formed on the substrate 1 or on the intermediate layer I, and by a second electrode 12 of the Schottky type, whose contact is formed on the upper guide.

The operation of switching from one guide to the other guide of the stacked structure is effected in that a difference in potential V is applied between the electrodes 100 and 12.

EXAMPLE III

Figure 2C:
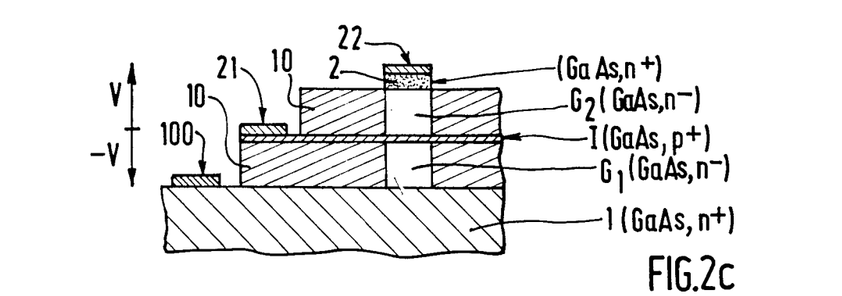

In this embodiment shown in FIG. 2c, the substrate 1 can consist of gallium arsenide (GaAs) of the n+ type; the guides can consist of gallium arsenide (GaAs) of the n− type, and the intermediate layer can be chosen to consist of gallium arsenide (GaAs) of the p+ type or of gallium aluminium arsenide (GaAlAs) of the p+ type, the use of the latter material reducing the optical losses. A layer of such a material may also be interposed between the substrate (which is then semi-insulating) and the lower guide. In these conditions, the upper guide is further covered by a layer 2 of gallium arsenide (GaAs) of the N+ type.

Moreover, in order to confine the light and to render the device symmetrical, the guides can be buried in a material 10 such as gallium aluminium arsenide of the n− type.

The polarization means for each stacked structure thus constituted are formed by a first electrode 21 of the type having an ohmic contact formed on the intermediate layer I, by a second electrode 100 of the type having an ohmic contact formed on the substrate and by a third electrode 22 of the type having an ohmic contact formed on the upper layer 2 of gallium arsenide of the n+ type.

The operation of switching from one guide to the other guide of the stacked structure is effected in that the first electrode 21, whose contact is formed on the intermediate layer, is brought to a reference potential and in that symmetrical potential differences are applied between the second electrode and the first electrode 100 and 21, respectively, on the one hand or between the third electrode and the first electrode 22 and 21, respectively, on the other hand in accordance with the desired switching sense.

Figure 2D:
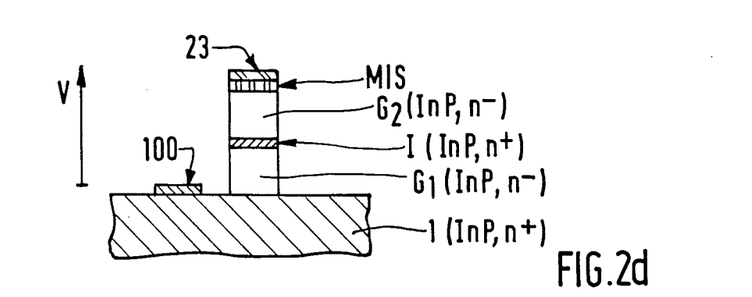

EXAMPLE IV this embodiment shown in FIG. 2d, the substrate 1 can consist of indium phosphide (InP) of the n+ type, like the intermediate layer(s) I. The lower and upper guides can consist of indium phosphide (InP) of the n− type.

The polarization means for each stacked structure thus constituted are formed by an ohmic contact 100 formed on the intermediate layer I or on the substrate and by a contact 23 of the MIS (Metal-Insulator-Semiconductor) type.

The operation of switching from one guide to the other guide of the stacked structure is effected in that a difference in potential V is applied between the electrode 100 and 23.

In an advantageous manner, the layers constituting the switching element according to the invention will be epitaxial layers formed from a mono-crystalline substrate. In fact, such layers have a simple construction and in addition their dimension at right angles to the substrate can be readily controlled. More particularly, it is easy to obtain a coupling distance d formed by the thickness of the intermediate layer I, which is very small, i.e. of the order of 0.5 μm, as already stated above.

In an even more advantageous manner, the switching element or the matrix will be obtained by means of a method using the anisotropic etching associated with the localized anisotropic epitaxial growth in preferential crystallographic directions of the monocrystalline substrate.

In fact, as shown by consideration of the prior art, all the manufacturing methods applied to the semiconductor devices are more or less anisotropic. Consequently, it is very advantageous to use this property to ensure that the light wave guides and the mirrors or plates having parallel reflecting surfaces are crystallographic facets.

The light is then better defined in the guides or better reflected by the mirrors.

The assembly of the devices according to the invention is preferably manufactured starting from light wave guides buried in the substrate. In fact, these guides are monomode guides at right angles to the substrate. However, these guides are also monomode guides parallel to the substrate. This effect is more readily obtained if a material of the same kind as the substrate will cover the lateral surfaces of the light wave guides.

The different FIGS. 4 illustrate a method of manufacturing, which satisfies these conditions and which is analogous to the Example I.

Figure 4A:
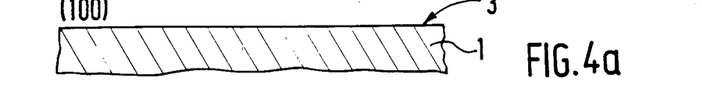
FIGS. 4a-4g shows an assembly which illustrates the different stages of a method of manufacturing a switching element according to the invention.
Figure 4B:
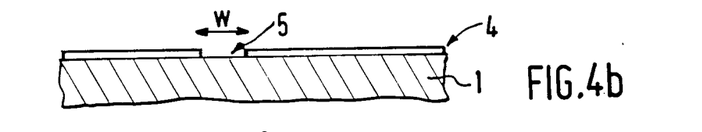
Figure 4C:
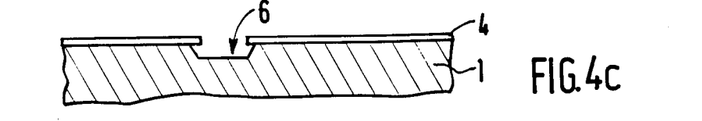

The method comprises the following steps:

(a) forming a monocrystalline substrate 1 of gallium arsenide (GaAs) of the n+ type doped, for example, at $6.10^{17}$ carriers per cm$^3$ and having a flat surface 3 orientated according to the crystallographic plane (100) (FIG. 4a);

(b) delimiting by means of a mask 4 slots 5 having a width w according to the crystallographic axes 8[10] and [110] perpendicular to the areas provided for the stacked structures $S_1$ and $S_1'$. This mask may consist of silica (SiO$_2$) and the width w of the slots may be 3 to 4 μm. The surface (100) of the substrate 1 is consequently exposed in these slots (FIG. 4b);

(c) etching the substrate in the slots, for example, by a chemical method or by a so-called RIE(Reactive Ion Etching) method. This method has in comparison with the other methods the advantage that etching edges are formed accurately perpendicular to the substrate and freed from underetching of the mask. Thus, in the slots 5 grooves 6 are formed in the substrate (FIG. 4c). These grooves 6 are formed over a small depth, for example, of 0.5 μm. Elimination of the mask 4:

(d) introducing the sample thus prepared into a vapour phase epitaxy reactor and lightly etching (in situ) in order that the crystalline surfaces developed in the grooves by RIE can appear more clearly. It should in fact be noted that, according to the thermodynamic conditions, the epitaxy reactor can permit an etching or an epitaxial growth. The longitudinal surfaces of the grooves are (110) and (110) surfaces.

Figure 4D:
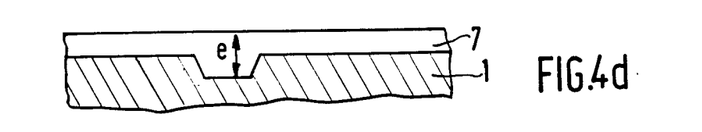
Figure 4E:
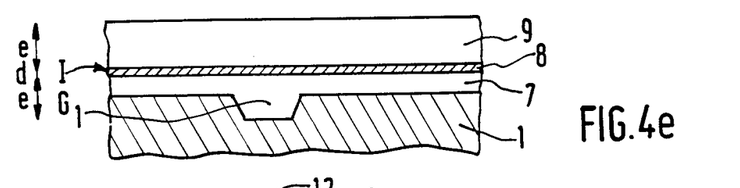
Figure 4F:
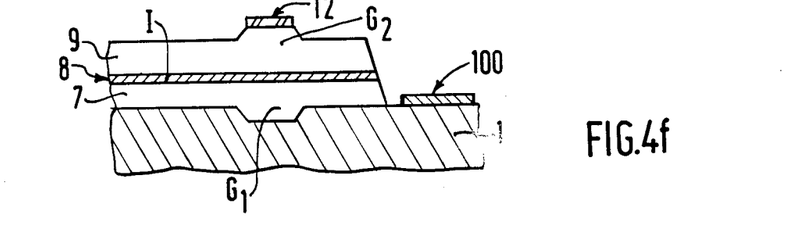
Figure 4G:
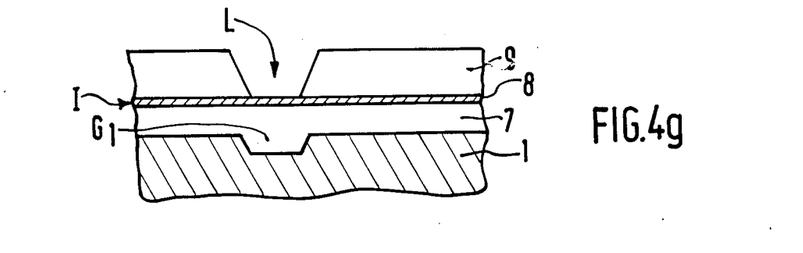

(e) Epitaxially growing, preferably from the vapour phase, from the crystallographic surfaces of the grooves a layer 7 of the material constituting the lower guides, for example, in the embodiment described herein, gallium arsenide of the n− type doped, for example, at a carrier level lower than $10^{15}$ per cm$^3$, this layer covering both the substrate and the grooves 6 in a planar manner. The thickness of the layer at the area of the groove is e (FIG. 4d);

(f) epitaxially growing, preferably from the vapour on the layer 7 a flat layer 8 of the material constituting the intermediate layer I, in this case gallium arsenide of the n+ type having a thickness d of, for example, 0.5 μm, and then epitaxially growing, preferably from the vapour phase, on the layer 8 a layer 9 having a thickness e of the material constituting the guides for forming the upper guide according to the structure shown in FIG. 4e;

(g) etching, for example, by RIE, in the opening of a fresh mask the last layer 9 over a small thickness in such a manner that the upper guides appear in relief, as shown in FIG. 4f;

(h) etching, for example, by RIE in the openings of a fresh mask grooves, whose surfaces constitute either the mirrors in the case of a switching element or the plates having reflecting parallel surfaces in the case of a matrix (FIG. 4g);

(i) forming the electrodes at the surface of the upper guides and an ohmic contact in an opening provided in the layers as far as the surface of the substrate (FIG. 4f) In another embodiment (Example III), moreover ohmic contacts would have to be formed on the intermediate layer in openings provided in the layers as far as the latter in the proximity of the stacked structures.

As far as the formation of the light wave guides by localized epitaxy is concerned reference is advantageously made to the article entitled "Structural analysis and optical characterization of low-loss GaAs wave guides fabricated by selective epitaxy" by N. VODJ-DANI, M. Erman and J. B THEETEN in "Journal of Crystal Growth 71 (1985), 141-148, North Holland, Amsterdam".

By way of example, the dimensions of the light wave guides perpendicularly to the substrate are also given here.

With an index $n_g \simeq 3.5$ corresponding to a substrate of gallium arsenide doped at $6.10^{17}$ carriers per cm$^3$ (n+ type), a difference between the indices $n_g - n_s \simeq 10^{-3}$ and a wavelength $\lambda_o \simeq 1.3$ μm, $0 < e < 7.5$ μm.

The thickness of the plates having parallel surfaces L (or the distance separating two flat mirrors H forming these plates) may be of the order of 1 μm.

The coupling length 1 is, as appears from the foregoing, of the order of 1 mm for a thickness of the intermediate layer $d \simeq 0.5$ μm.

The etching treatment suitable for forming the plates L or the mirrors is evidently carried out over a depth of the order of e.

The electrodes constituting the polarization means can all be formed on the surface 3 of the substrate 1 as the device, even when an ohmic contact intended to receive the potential is preferably provided on the substrate.

For this purpose, an opening is exposed in the upper layer in such a manner that the layer or the substrate appears, on which the electrode has to be formed. The electrode is then formed in this opening, which is positioned in the proximity of the stacked structure which has to be polarized.

In general, the ohmic contacts can be provided by means of a gold-germanium-nickel alloy (Au-Ge-Ni) and the electrodes of the Schottky type by a layer of titanium-platinum-gold (Ti-Pt-Au).

It is clear that other ways and methods of obtaining devices according to the invention are possible without departing from the scope of the invention, as defined by the appended claims.

What is claimed is:

1. An optical switching element comprising a semiconductor substrate of a material having a first refractive index; first and second light wave guides formed from first and seconduniform layers of a semiconductor material having a refractive index lower than said first refractive index stacked one above the other on the substrate; a uniform intermediate layer of a compatible semiconductor material disposed between the first and second uniform layers, said intermediate layer having a refractive index lower than said second refractive index of said first and second layers and a thickness forming the coupling distance between the first and second layers;and polarization means coupled to the first and second guides whereby the light which is introduced into one of the guidesis selectively causedto propagate through the other guide,the assembly of the first, lower guide forming with the second, upper guide and with the intermediate layer a first stacked structure whose longitudinal dimension is equal to the coupling length.

2. A switching element as claimed in claim 1, further comprising a flat first mirror disposed at one end of the second light guide at right angles to the substrate and enclosing with respect to the second guide an angle different from the normal line; and a third light wave guide formed by a strip of semiconductor material identical to that forming the second guide to transmit the beam originating from the second guide and reflected by the mirror, said third guide disposed at substantially the same distance form the substrate as the second guide.

3. A switching element is claimed in claim 2, comprising a fourth light wave guide and a second intermediate layer arranged as a second stacked structure together with said third light wave guide, which second stacked structure is identical to the first stacked structure and in which the fourth gyide is the lower guide and the third guide is the upper guide; and polarizing means operatively associated with said secondstacked structure.

4. A switching element as claimed in claim 3, comprising a flat second mirrorparallel to said first mirror and having the same structure arranged adjacent the end of the third light guide structure.

5. A switching element as claimed in any one of claims 1 to 4, characterized in that the layers forming the guides and each of the intermediate layers are epitaxial layers formed on a noncrystalline substrate.

6. A switching element as claimed in any of claims 1-4, wherein the layers forming the guides and each of the intermediate layers are epixtaxial layers formed on a monocrystalline substrate, the planeof the substrate on which the guides are formed is the (100) plane, the guides are formed parallel to the crystallographic axes or, and each of the mirrors is aligned parallel to a crystallographic surface selected from the group consisting of the (010) and (001) planes.

7. A switching element as claimed in any of claims 1-4, wherein the layers forming the guides and each of the intermediate layers are epixaxial layers formed on a monocrystalline substrate, the plane of the substrate on which the guides are formed is the (100) plane, the guides are aligned parallel to the Crystallographic axes or, and each of the mirrors is aligned parallel to a crystallographic surface selected from the group consisting of the (010) and (001) planes which is formed by etching grooves in the surface of the substrate, said grooves having a depth substantially equal to the depth of each of the stacked structures, and by epitaxial growth of the layers forming the stack in said grooves, followed by etching of a groove having a depth substantially equal to the depth of the first guide in such a manner that the lateral surfaces of these grooves constitute the surfaces of the mirrors.

8. A switching element as claimed in any of claims 1 to 4, wherein the substrate and each of the intermediate layers comprise highly doped n-type gallium arsenide (GaAs), and the light guides comprise lower doped n-type gallium arsenide (GaAs), and in that the polarization means for each of the stacked structures comprise a first electrode of the Schottky type provided on the upper guide, and an ohmic electrode provided on one of the substrate and the intermediate layer.

9. A switching element as claimed in any of claims 1 to 4, wherein the substrate comprises highly doped n-type gallium arsenide (GaAs), the guides comprise lower doped n-type gallium arsenide (GaAs), and each of the intermediate layers comprises n-type gallium aluminum arsenide (GaAlAs), and the polarization means for each of the stacked structures comprise a first ohmic electrode on the substrate and a second electrode of the Schottky type on the upper guide.

10. A switching element as claimed in any of claims 1 to 4, wherein the substrate comprises highly doped N-type gallium arsenide (GaAs), the guides comprise lower doped n-type gallium arsenide (GaAs) and the intermediate layer comprises highly doped N-type gallium arsenide (GaAs), further comprising a layer of highly doped n-type gallium arsenide (GaAs) on the upper guide and wherein the polarization means for each of the stacked structures comprises a first ohmic electrode on the intermediate layer and connected to a reference potential, a second ohmic electrode on the substrate, a third ohmic electrode on the upper layer of highly doped n-type gallium arsenide, and means for applying symmetrical potential differences between the first and second electrode on the one hand or between the third and first electrode on the other hand according to the desired switching sense.

11. A switching element as claimed in any of claims 1 to 4, wherein the substrate and each intermediate layer comprises highly doped n-type indium phosphide (InP), and wherein the guide comprise lower doped n-type indium phosphide (InP) and the polarization means for each of the stacked structures comprise an ohmic contact, provided on one of the intermediate layer and the substrate, and by a contact of the MIS type (Metal-Insulator-Semiconductor).

12. An optical switching matrix comprising a number n of inputs ($IN_1, IN_2 \ldots IN_n$) and a number n of outputs ($0_1, 0_2 \ldots 0_n$), between which the switching operations are effected, comprising an array of nxn stacked light guide switching elements each element comprising upper and lower spaced-apart coupled light guides juxtaposed with the columns of the matrix in line with its inputs ($IN_1, IN_2 \ldots IN_n$) and formed by first structures of the switching elements, whose lower guides are in line with each other whereby the lines of the matrix in line with said outputs ($0_1, 0_2 \ldots 0_n$) are formed by second structures of the switching elements, whose lower guides are inline with each other, and where in a first mirror of one element forms with a second mirror of another juxtaposed element a plane-parallel plate, whose external surfaces are totally relecting, and means for selectively independently switching light signals between the upper and lower guides of said switching elements.

13. An optical switching matrix comprising first and second selectively coupled arrays of light guides, said first array comprising a plurality of rows of light guide elements connected to an input of said matrix, and a plurality of columns of light guide elements, each column connected to an output of said matrix; and said second array overlaying said first array and comprising a plurality of rows and a plurality of columns of light guide elements intersecting at a plurality of nodes, and a plurality of mirrors, for transferring a signal from a row to a column, one mirror disposed at each of said nodes; and means for selectively coupling adjacent elements of said first and second arrays of light guide whereby when adjacent elements are coupled, a signal is transferred from one of said first and second arrays to the other.

14. An optical switching matrix as claimed in claim 13 wherein said first array of light guides comprises a semiconductor substrate formed from a material characterized by a first refractive index and a first plurality of strips of semiconductor material on said substrate characterized by a second, higher refractive index; said second array of light guides comprises a second plurality of semiconductor strips parallel to and overlying said first plurality of strips, and an intermediate layer of semiconductor material between said first and second plurality of strips, said intermediate layer characterized by a refractive index lower than the refractive index of said first and second plurality of strips; and wherein said means for selectively coupling adjacent elements of said first and second arrays comprises polarization means coupled to said adjacent elements for selectively causing light in one light guide to be coupled to an adjacent light guide.

15. A switching matrix as claimed in claim 14, wherein the substrate and each of the intermediate layers comprises highly doped n-type gallium arsenide (GaAs), and the light guide elements comprise lower doped n-type gallium arsenide (GaAa), and wherein the polarization means for each of the light guide elements comprises a first electrode of the Schottky type provided on the upper strip, and an ohmic electrode provided on one of the substrate and the intermediate layer.

16. A switching matrix as claimed in claim 15, wherein the substrate and each of the intermediate layers comprises highly doped n-type gallium arsenide (GaAs), and the guides comprise lower doped n-type gallium arsenide (GaAs), and wherein the polarization means for each of the adjacent elements comprise a first electrode of the Schottky type provided on the upper strip of each element, and an ohmic electrode provided on the substrate or on the intermediate layer.

17. A switching matrix as claimed in claim 16, wherein the substrate and each of the intermediate layers comprises highly doped n-type gallium arsenide (GaAs), and the light guide elements comprise lower doped n-type gallium arsenide (GaAs), and wherein the polarization means for each of the light guide elements comprise a first electrode of the Schottky type provided on the upper strip of each element, and an ohmic electrode provided on one of the substrate and the intermediate layer.

18. A switching matrix as claimed in claim 14, wherein the substrate comprises highly doped n-type gallium arsenide (GaAa), the light guide elements comprise lower doped n-type gallium arsenide (GaAs), and each of the intermediate layers comprises n-type gallium aluminum arsenide (GaAlAs), and the polarization means for each of the light guide elements comprise a first ohmic electrode on the substrate and a second electrode of the Schottky type on the upper strip.

19. A switching matrix as claimed in claim 15, wherein the substrate comprises highly doped n-type gallium arsenide (GasAs), the light guide elements comprise lower doped n-type gallium arsenide (GaAs), and each of the intermediate layers comprises n-type gallium aluminum arsenide (GaAlAs), and the polarization means for each of the light guide elements comprise a first ohmic electrode on the substrate and a second electrode of the Schottky type on the upper strip.

20. A switching matrix as claimed in claim 16, wherein the substrate comprises highly doped n-type gallium arsenide (GasAs), the light guide elements comprise lower doped n-type gallium arsenide (GaAs), and each of the intermediate layers comprises n-type gallium aluminum arsenide (GaAlAs), and the polarization means for each of the light guide elements comprise a first ohmic electrode on the substrate and a second electrode of the Schottky type on the upper strip.

21. A switching matrix as claimed in claim 14, wherein the substrate comprises highly doped n-type gallium arsenide (GaAa), the light guide elements comprise lower doped n-type gallium arsenide (GaAs) and the intermediate layer comprises highly doped n-type gallium arsenide (GaAs), further comprising a layer of highly doped n-type gallium arsenide (GaAs) on the upper strip and wherein the polarization means for each of the light guide elements comprises a first ohmic electrode on the intermediate layer and connected to a reference potential, a second ohmic electrode on the substrate and a third ohmic electrode on the upper strip of highly doped n-type gallium arsenide and means for applying symmetrical potential differences between one of the first and second electrode on the one hand and the third and first electrode on the other hand according to the desired switching sense.

22. A switching matrix as claimed in claim 15, wherein the substrate comprises highly doped n-type gallium arsenide (GaAs), the light guide elements comprise lower doped n-type gallium arsenide (GaAs) and the intermediate layer comprises highly doped n-type gallium arsenide (GaAs), further comprising a layer of highly doped n-type gallium arsenide (GaAs) on the upper strip and wherein the polarization means for each of the elements comprises a first ohmic electrode on the intermediate layer and connected to a reference potential, a second ohmic electrode on the substrate and a third ohmic electrode on the upper strip of highly doped n-type gallium arsenide and means for applying symmetrical potential differences between one of the first and second electrodes on the one hand or between the third and first electrode on the other hand according to the desired switching sense.

23. A switching matrix as claimed in claim 16, wherein the substrate comprises highly doped n-type gallium arsenide (GaAs), the strips of the first and second arrays comprise lower doped n-type gallium arsenide (GaAs) and the intermediate layer comprises highly doped n-type gallium arsenide (GaAs). further comprising a layer of highly doped n-type gallium arsenide (GaAs) on the second array and wherein the polarization means for each of the elements comprises a first ohmic electrode on the intermediate layer and connected to a reference potential, a second ohmic electrode provided on the substrate and a third ohmic electrode on each element of the second array of highly doped n-type gallium arsenide and means for applying symmetmrical potential differences between one of the first and second electrode on the one hand and the third and first electrode on the other hand according to the desired switching sense.

24. A switching matrix as claimed in claim 15, wherein the substrate and each of the intermediate layers comprise highly doped n-type indium phosphide (InP), and wherein the strips of the first and second arrays comprise lower doped n-type indium phosphide (InP) and the polarization means for each of the elements comprise an ohmic contact, provided on one of the intermediate layer and the substrate, and by a contact of the MIS type (Metal-Insulator-Semiconductor).

25. A switching matrix as claimed in claim 15, wherein the substrate and each of the intermediate layers comprise highly doped n-type indium phosphide (InP), and wherein the strips of the first and second arrays comprise lower doped n-type indium phosphide (InP) and the polarization means for each of the elements comprise an ohmic contact, provided on one of the intermediate layer and the substrate, and by a contact of the MIS type (Metal-Insulator-Semiconductor).

26. A switching matrix as claimed in claim 16, wherein the substrate and each of the intermediate layers comprise highly doped n-type indium phosphide (InP), and wherein the strips forming the first and second arrays comprise lower doped n-type indium phosphide (InP) and the polarization means for each of the elements comprise an ohmic contact, provided on one of the intermediate layer and the substrate, and by a contact of the MIS type (Metal-Insulator-Semiconductor).

* * * * *